Sept. 18, 1951  R. D. HOFFMAN  2,568,547
HOOK-CONCEALING AND RELEASING FISH LURE
Filed March 28, 1949
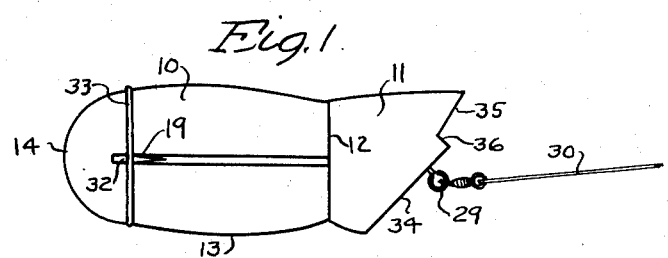
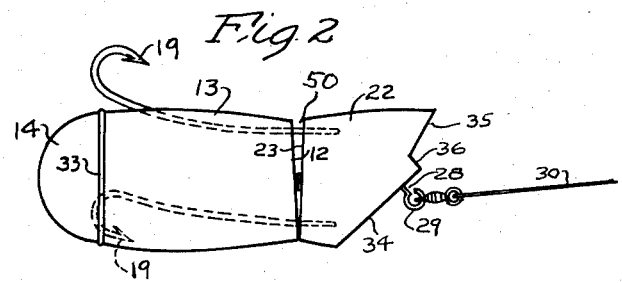
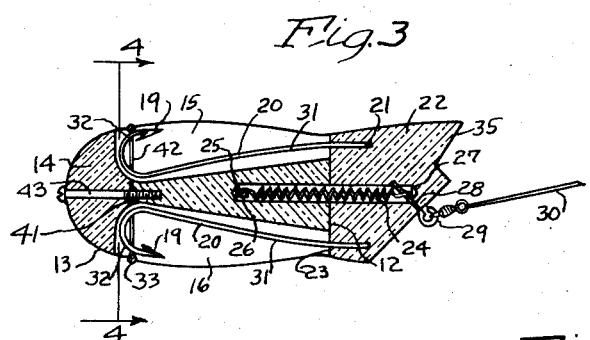
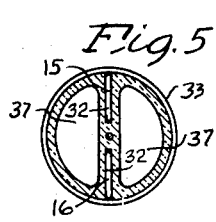 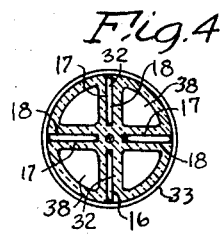 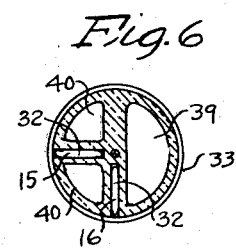
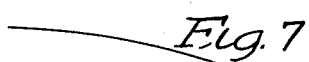
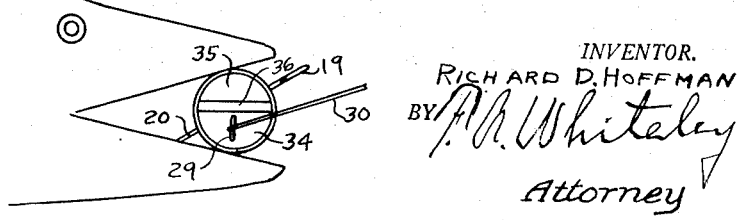
INVENTOR.
RICHARD D. HOFFMAN
BY
Attorney Patented Sept. 18, 1951

2,568,547

UNITED STATES PATENT OFFICE 2,568,547

HOOK-CONCEALING AND RELEASING FISH LURE

Richard D. Hoffman, Minneapolis, Minn.

Application March 28, 1949, Serial No. 83,926

8 Claims. (Cl. 43—42.04)

My invention relates to a hook-concealing and releasing fish lure, and has for its object to provide a fish lure which is at the same time sturdy in construction, deceptive in appearance, with concealed hooks mounted for release when the lure is struck by a fish from practically any direction, said body portion including two parts held together for separation either by direct pull to the rear of the lure, or by having the main body portion struck either directly or at any angle from the side about the lure, said hooks being concealed in the larger body portion of the fish lure and so held that separation of the two body parts either directly or by angular rocking thereof will release one or more of said hooks.

Many so-called weedless hooks have been designed, wherein the hook or hooks, or the points thereof, are covered and guarded in some manner to theoretically prevent accumulations of weeds on the hooks. In such prior art examples, means is provided which is supposed to release the hook from its protecting means upon a fish taking the bait.

But a serious defect has existed in such prior art lures, in that the release of the hooks has depended primarily upon the lure being gripped in the mouth of the fish from behind so as to pull directly backward on the lure. In the lure of my invention, the "strike" of the fish is what releases the hook. That is, whenever the fish strikes the lure with his open mouth at whatever angle the strike is made, the hook will be released, usually in the mouth of the fish, and a catch will result.

Since in practice most strikes come from the side at an angle to the body of the fish lure, such fish lures as heretofore have been constructed have not reacted to such strikes to release the hooks, with the result that a very small percentage of strikes actually made on these currently used concealed-hook lures results in the hooking of a fish.

It is a principal object of my invention, therefore, to provide a fish lure which will attract the fish from any direction at various angles at the sides and upward from toward the bottom of the lake, and which, while concealing and protecting the hook in weeds, until a strike has been made, nonetheless will respond to a strike made by a fish coming to the lure in any angular direction as well as from straight behind and invariably will release the hook or hooks usually directly in the mouth of the fish.

It is a further object of my invention to provide a fish lure in two parts spring-held together, in which the rear or trailing part of the lure shall have one, two or as many as four slots formed therein, each of which houses a hook firmly anchored in the other part, said hooks being of spring material normally tending to fly out of the slots and being held positioned in and concealed by the slots as long as the two parts of the lure have their faces held in firm but yielding engagement, but which, when said surfaces are separated, either directly, or angularly to one side only, will be released and fly out of the body of the lure.

It is a further object of my invention to form the two sections with plane faces held firmly in contact by spring means extending between the two sections, but which faces will separate, either fully, or angularly at one side thereof, when the lure is struck by a fish, and thereby will release one or more of said hooks from the concealing slots.

It is a further object of my invention to have a metallic ring embedded or otherwise secured about the trailing end of the fish lure, which extends across the ends of the slots away from the contacting faces of the two portions of the lure, which ring will take over the curved part of the hook to permit release thereof upon separation of the parts of the hook either directly for the entire area of said contacting parts, or by rocking the parts relatively to separate them along one edge portion only.

It is a further and highly important feature of my fish lure to form it of certain translucent materials, such as a number of forms of plastic materials, and to form the slots in the body of the larger part of the fish lure with smooth surfaces which will catch the light in every direction, for example, the form of fish lure which has four slots to accommodate four hooks will have eight light reflecting surfaces, which, in the translucent form of my invention will constantly flash reflected light from all directions and thereby entice adjacent fish to strike the lure.

The full objects and advantages of my invention will appear in detail in connection with the detailed description of my fish lure given in the following specification, and the novel features of the invention whereby the above noted advantageous and important results are obtained are particularly pointed out in the claims.

In the drawings illustrating applications of my invention in some of its forms,

Fig. 1 is a side elevation view of my fish lure showing a front view of a slot housing and concealing one fishhook and showing the manner in which the metal ring near the end of such body part is engaged by and holds in concealed position one such fishhook.

Fig. 2 is a similar view showing the lure when it has been struck on its larger end by a fish moving in or near the plane of one fishhook so the two parts of the lure have been rocked relative to each other and at least one fishhook released and in active position with the other fishhook shown in dotted lines ready for release.

Fig. 3 is a sectional view through the plane of a pair of fishhooks showing the manner in which the two parts of the lure are held together and showing at least two of the reflective walls of translucent material.

Fig. 4 is a sectional view taken on line 4—4 of Fig. 3, showing a group of four slots each having two light reflecting surfaces, or eight such surfaces in all, and each including a concealed hook held in concealed position by a metal band, also showing four chambers with walls having light-reflecting surfaces.

Fig. 5 is a view similar to Fig. 4, showing two opposed slots and concealed hooks, also two chambers.

Fig. 6 is a view similar to Fig. 4, showing two slots at right angles to each other, each having two reflective surfaces, or four such reflective surfaces in all, and each having therein a concealed hook, also three chambers with light-reflecting surfaces.

Fig. 7 is a schematic view indicating a strike of a fish on the larger part of the lure and the resulting angular separation of the two parts of the lure, as in Fig. 2, to release one or both of said hooks.

As illustrated, my fish lure includes two body portions 10 and 11. The main body part is circular in cross section throughout its length with increasing diameter to about its center and thereafter decreasing in diameter, and having a plane surface 12 across its inner end and bulging curved surfaces 13 merging in a semi-spherical end portion 14. In radial opposition are two slots 15 and 16, as shown in Figs. 2 and 5, and also in Fig. 4, where there are four such slots.

Each of these slots includes a pair of faces 17 and 18. One pair of slots 15 and 16, in Fig. 4, are diametrically opposite with one more pair also diametrically opposite and at right angles to the first pair, as shown in Fig. 4.

In Fig. 5, there is one pair of slots shown extending in opposite directions.

In Fig. 6, the slots 15 and 16 are shown located at right angles to each other.

Each of the slots, in whichever arrangement is designated, includes a fishhook 19 having a shank 20 anchored at 21 in a second body part 22. The body part 22 has a plane face 23 firmly held in engagement with the face 12 of the part 10 by means of a spring 24.

The spring 24 extends centrally through adjacent portions of the parts 10 and 22 and across the line of contact of the ends of said parts 12 and 23. It is a strong spring anchored at 25 to a pin 26 extending transversely of the main body part 13, and it is anchored in the body part 22 at 27 by means of a screw member 28 which has an eye 29 to which a swiveled leader 30 for the fish line is attached.

From an inspection of Figs. 1 and 3 it will be apparent that the hooks 19 are within slots 15 and 16, with the shank 20 bent as at 31, and that the curved outer parts 32 of the hooks 19 are engaged by an annular metal ring 33 or abutment which is countersunk into the body portion 10 near its semi-spherical portion 14.

The spring 24 has sufficient power to hold the faces 12 and 23 of parts 22 and 10 in firm engagement. Thereby it enables contact of the curved portion 32 of hooks 19 with ring 33 to retain the hooks in the slots.

When, however, the faces 12 and 23 of the two parts are caused to separate, either throughout their surfaces or, more important, at one edge only, effecting a V-shaped gap 50 between them, as shown in Fig. 2, one or more hooks 19 will instantly be released, will fly out of the slots in the body portion 13, as shown in Figs. 2 and 7, and usually one or more of said hooks will fly within the mouth of the striking fish, and hooking of the fish will result.

The part 22 will preferably be provided with a downwardly sloping surface 34 and a second surface 35, angularly disposed to the surfaces 34, and set back as indicated at 36. The effect of this as seen moving in the water is to simulate a mouse or similar live bait, and where the body parts, particularly the larger part 10, are or is formed of translucent material the faces of all the slots will flash reflected light and greatly add to the effectiveness of the lure.

Also the rearwardly and downwardly sloping faces 34 and 35 in relation to the line-attaching eye 29 will tend to cause the lure as moved through the water not only to dive below or to rise to the surface, but to bob up and down, thus shifting the light surfaces of the slots in the translucent body part and causing light flashing which will lure the fish.

It is also within the scope and purpose of my invention to provide air chambers in the body part 10, such as are indicated at 37 in Fig. 5, at 38 in Fig. 4, and at 39 and 40 in Fig. 6. The purpose of these air chambers is to provide additional reflecting surfaces and to make the lure light enough so it will float.

To effect this arrangement I will preferably make the semi-spherical cap portion 14 of a separate piece with a joint at 41 and a gasket at 42, Fig. 3, held together by a screw bolt 43. This will enable positioning of the ring member 33 in the groove jointly formed in members 13 and 14, and also will facilitate the provision of the openings 37, 38, 39 and 40, which openings may be extended into the head member 14. Glue can be used in place of the screw 43.

The air chambers also will have extensive surfaces which will act as reflectors of light transmitted through the translucent material forming the trailing body part.

The advantages of my invention will very clearly appear from the foregoing specification. Although the lure is extremely simple, the means of holding the hooks in position is in the highest degree effective, both to retain the hooks within the slots until a fish strikes the lure and to instantly release one or more of them whenever the fish strikes.

The preferred form of the invention will be the one in which four hooks respectively at right angles about the main body of the lure are provided. With that arrangement it will simply be impossible for a fish to strike the lure at any angle without releasing one or more of the hooks directly into his mouth, when hooking the fish will almost certainly take place.

I claim:
1. A fish lure, comprising two body parts having plane-faced adjacent ends, spring means an- chored in the respective body parts and holding said ends continuously in firm contact, line connecting means on one of said parts, the other part having a longitudinal slot, a spring-shank hook having the end of the shank anchored in the line-connected part, and means for releasably holding the hook in the slot against the spring action of the shank, whereby when the lure is struck from any direction the body parts will be caused to separate and the hook be released.

2. A fish lure, comprising two body parts having plane-faced adjacent ends, spring means anchored in the respective body parts and holding said ends continuously in firm contact, line connecting means on one of said parts, the other part having a longitudinal slot, a spring-shank hook having the end of the shank anchored in the line-connected part, and an abutment which extends across the slot near one end engageable with the curve of the hook near the free end of the hook for releasably holding the hook in the slot against the spring action of the hook, whereby when the lure is struck from any direction the body parts will be caused to separate and the hook be released.

3. A fish lure, comprising two body parts having plane-faced adjacent ends, spring means anchored in the respective body parts and holding said ends continuously in firm contact, line-connecting means on one of said parts, the other part having a plurality of longitudinal slots, a corresponding number of spring-shank hooks having the ends of the shanks anchored in the line-connected part, and means for releasably holding one of said hooks in each slot against the spring action of the shank, whereby when the lure is struck from any direction the body parts will be caused to separate and a hook or hooks be released.

4. A fish lure, comprising two body parts having plane faced adjacent ends, spring means anchored in the respective body parts and holding said ends continuously in firm contact, line connecting means on one of said parts, the other part having a plurality of longitudinal slots, a corresponding number of spring shank hooks having the ends of the shanks anchored in the line-connected part, a metallic ring embedded in the other part and near one end and extending across each of said slots adapted to be engaged by the curve of the hook near the free end of the hook for releasably holding the hook in the slot against the spring action of the hook, whereby when the lure is struck from any direction the body parts will be caused to separate and one or more of said hooks be released.

5. A fish lure, comprising two body parts having plane-faced adjacent ends, at least the trailing one of said body parts being formed of translucent material, spring means anchored in the respective body parts and holding said ends continuously in firm contact, and a hook having a spring shank anchored to the forward body part, line connecting means on one of said parts and the other part having a longitudinal slot for housing the hook and its spring-shank, said slot having walls of considerable extent, the respective wall surfaces acting as reflectors of light through said translucent material, whereby as the lure is moved in the water light will be flashed from said reflector surfaces and will have the effect of enticing a fish to strike.

6. A fish lure, comprising two body parts having plane faced adjacent ends, at least the trailing one of said body parts being formed of translucent material, spring means anchored in the respective body parts and holding said ends continuously in firm contact, and a hook having a spring shank anchored to the forward body part, line connecting means on one of said parts, the other part having a longitudinal slot for housing the hook and its spring-shank said slot having walls of considerable extent, a plurality of sealed chambers in said last named part having extensive wall surfaces, the respective wall surfaces of the slot and of the chambers acting as reflectors of light through said translucent material, whereby as the lure is moved through the water light will be flashed from said surfaces and will have the effect of enticing the fish to strike.

7. A fish lure, comprising two body parts having plane-faced adjacent ends, at least the trailing one of said body parts being formed of translucent material, spring means anchored in the respective body parts and holding said ends continuously in firm contact, and line-connecting means on one of said body parts, the other part having a plurality of longitudinal slots each for housing a spring-shank releasable hook, and a plurality of sealed chambers, the walls of said slots and said chambers having surfaces of very considerable extent acting as reflectors of light through said translucent material, whereby as the lure is moved in the water light will be flashed from said reflector surfaces and will have the effect of enticing a fish to strike.

8. A fish lure, comprising two body parts having plane-surfaced adjacent ends and at least one of said body parts being formed of translucent material, spring means anchored in the respective body parts and holding said ends normally in the firm contact, the other part having a plurality of longitudinal slots each formed with two surfaces of considerable extent for reflecting light therefrom through the translucent material, and a releasable hook secured to one of the parts and located in each of said slots, a plurality of sealed chambers having surfaces of very considerable extent acting as reflectors of light through said translucent material, extensive wall surfaces on each of said slots acting as reflectors of light through said translucent material, whereby as the lure is moved in the water light will be flashed from all reflector surfaces and have the effect of enticing the fish to strike.

RICHARD D. HOFFMAN.

REFERENCES CITED

The following references are of record in the file of this patent:

UNITED STATES PATENTS

| Number | Name | Date |
|---|---|---|
| 1,209,237 | Warren | Dec. 19, 1916 |
| 2,127,761 | Beck | Aug. 23, 1938 |
| 2,163,666 | Carter et al. | June 27, 1939 |
| 2,436,232 | Shetka | Feb. 17, 1948 |
| 2,467,244 | Van Hee et al. | Apr. 12, 1949 |